United States Patent [19]

Eigenmann

[11] 3,935,365

[45] Jan. 27, 1976

[54] ANTI-SKID AND WEAR-RESISTING ROAD MARKING TAPE MATERIAL

[76] Inventor: Ludwig Eigenmann, Vacallo, Ticino, Switzerland

[22] Filed: Jan. 22, 1974

[21] Appl. No.: 435,476

[30] Foreign Application Priority Data

Jan. 22, 1973  Italy ................................. 19444/73

[52] U.S. Cl. ................ 428/323; 428/213; 428/325; 428/329; 428/331
[51] Int. Cl.² .......................................... B32B 5/16
[58] Field of Search ............... 161/4, 2, 5, 162, 168, 161/165; 404/9, 14; 305/105, 109; 428/323, 325, 329, 331, 213

[56] References Cited
UNITED STATES PATENTS

| | | | |
|---|---|---|---|
| 3,587,415 | 6/1971 | Eigenmann | 404/9 |
| 3,746,425 | 7/1973 | Eigenmann | 350/109 |
| 3,782,843 | 1/1974 | Eigenmann | 404/9 |

Primary Examiner—Mayer Weinblatt
Attorney, Agent, or Firm—Michael J. Striker

[57] ABSTRACT

The disclosure describes an improved tape material for use on a roadway pavement to form a traffic regulating strip or other sign thereon. The new material has a twin-layer structure including a lower relatively thin support layer and an upper principal thicker layer formed of a composition having a high internal molecular cohesion and having hard crystalline particles and light-reflecting particles embedded therein at various levels, the particles having portions which emerge above the upper face of the material to impart good anti-skid characteristics and nighttime visibility thereto, these properties being maintained as the material is progressively worn by the traffic due to progressive emergence of more deeply embedded particles.

15 Claims, 14 Drawing Figures

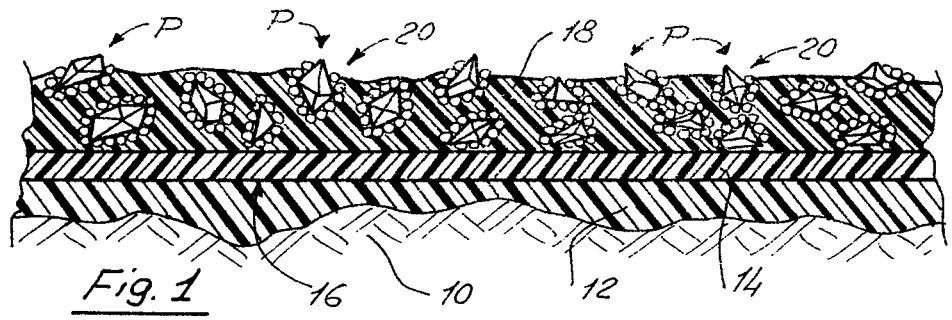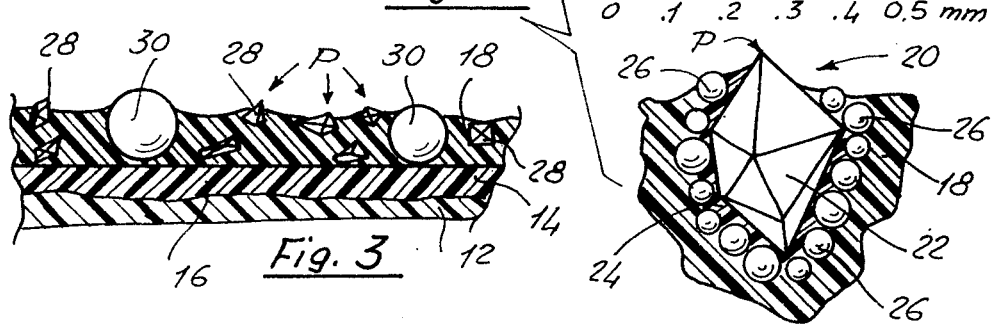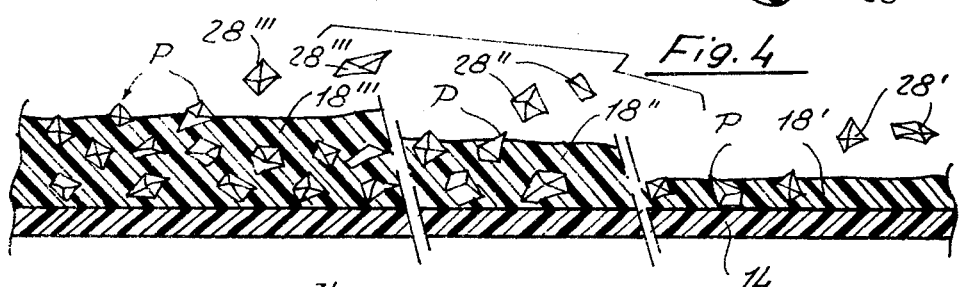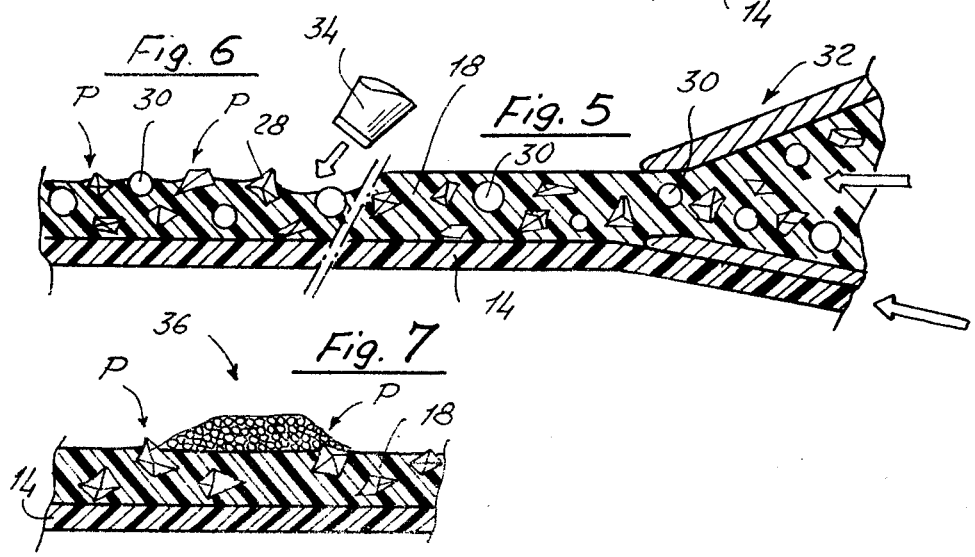

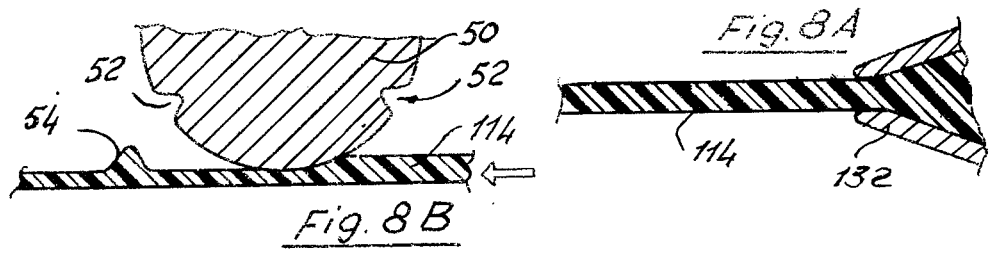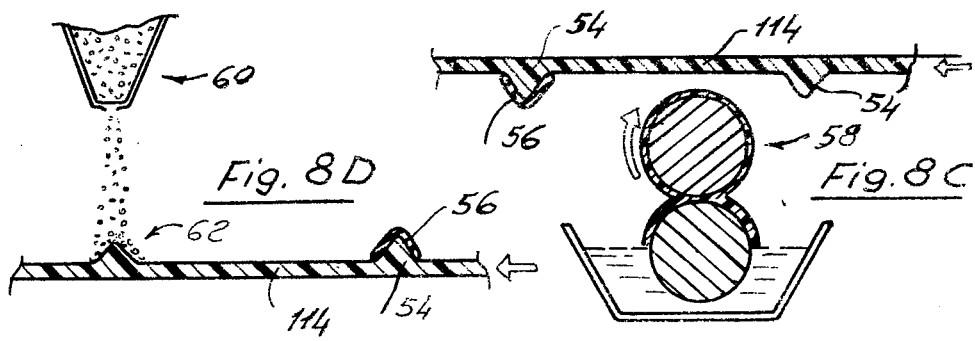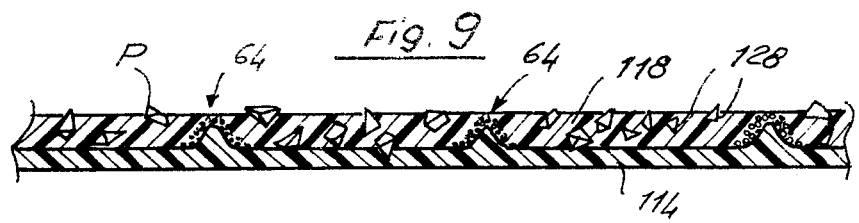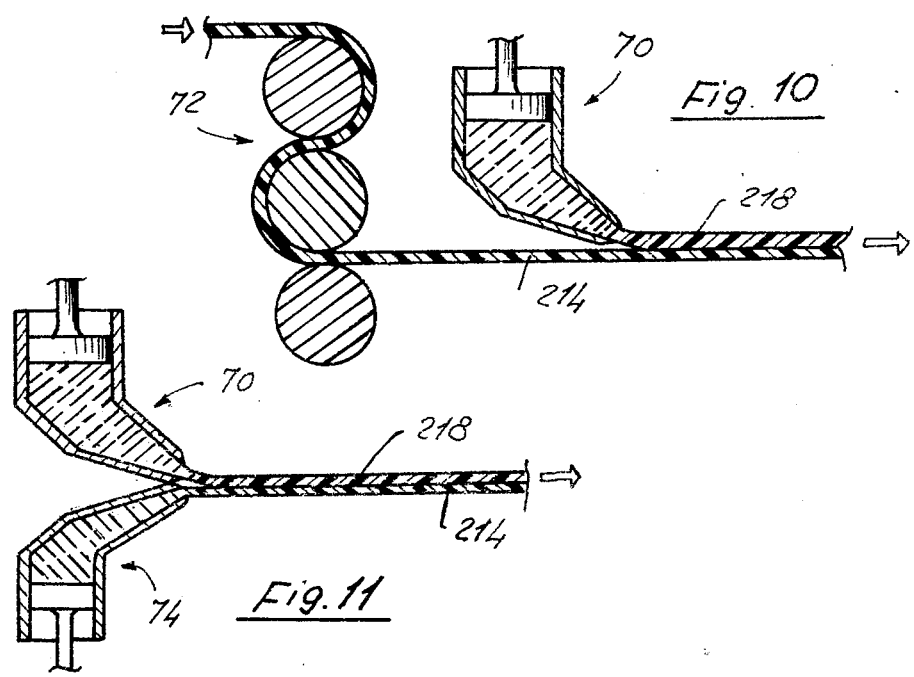

ANTI-SKID AND WEAR-RESISTING ROAD MARKING TAPE MATERIAL

BACKGROUND OF THE INVENTION a. The Field of the Invention

This invention relates to road surface marking tape materials for use on a roadway pavement so as to provide a traffic regulating indicium thereon, and more particularly this invention relates to a new and improved tape material of the general character described in my prior U.S. Pat. No. 3,782,843 (U.S. patent application Ser. No. 153,218 filed June 15, 1971), corresponding to my French Patent No. 2,097,941, Swedish Patent No. 361,694, and German Patent Application No. P 2130529, open to public inspection.

b. The prior Art

According to the above prior art, upon which the present invention provides a sharp improvement, there has been suggested and made known a marker for use on a roadway pavement, comprising a base compound including a binder and having a smooth, substantially planar and highly light-reflective surface adapted to face away from said pavement, and a plurality of hard crystalline particles, each having a largest dimension between substantially 0.1 and 1 millimeters, and at least some of which include an upper portion extending outwardly from said surface to impart good anti-skid properties to the same surface, while the light reflectivity of the marker in use on the road pavement is high due to the small fraction of the total area of said surface constituted by said upwardly extending upper portions of the hard crystalline particles.

Further according to said prior art, the said hard particles are firmly bound and secured to the marker material base compound, including the said binder, by a second binder intimately contacting each individual particle, said second binder wetting said particles when contacted therewith and being compatible with said first binder.

Still further according to said prior art, the said very hard particles comprise crystals having a hardness substantially higher than 7 on the Mohs' Hardness Scale and more particularly corundum crystals, coated with epoxy resin before being added to and mixed with the base compound. This latter compound preferably consists of a mixture of binder agents, such as butadiene-acrylonitrile copolymeric rubber and polyvinyl chloro-acetate copolymer, and fillers, such as titanium dioxide, kaolin, calcium carbonate and so on, adapted for imparting the desired color to the tape material.

The object of this invention is to provide a new and improved road surface marking tape material, generally of the kind and for the use set forth above, sharply improved in comparison to the above indicated prior art so that the combination of the following principal advantages is attained:

the new material provides a highly light reflective and anti-skid upper surface having an improved wear resistance against traffic, and the anti-skid properties of which are substantially maintained even after substantial wearing-off of the tape upper layer upon extensive service and traffic abuse;

the new material provides an improved and uniform bond with the generally bitumen based underlayer or receiving layer (generally termed "primer" layer in the specific art to which this invention appertains) preliminarily and commonly freshly formed on the roadway pavement to provide an impervious, uniform and smooth surface area on which the marking tape material can be laid and adhesively secured;

the new material is particularly adapted for ready and economical manufacture on a mass production basis and does not require the step of individually coating the particles which impart the anti-skid properties, while the firm bond of even partially embedded particles with the material is ensured and even improved;

the new material may be and preferably is also provided with light retro-collimating units or aggregates for improving the nighttime visibility of the traffic regulating signs or indicia, the features of the new material being such as to ensure the firm bond and the most efficient service of said units or aggregates.

BRIEF SUMMARY OF THE INVENTION

Substantially, according to the invention, there is provided a tape material designed to be laid on and adhesively secured to the upper face of a preliminarily formed and doctored primer layer on a roadway pavement to form a traffic regulating sign on said pavement, said tape material comprising at least two essentially flexible superimposed and juxtaposed layers including an upper and principal layer of thickness greater than half of the overall thickness of the tape material and of the largest dimension of the particles, units and aggregates embedded therein, and forming the exposed face subject to traffic wear, and a lower layer adapted to be laid on and adhesively secured to said primer layer, the said upper layer consisting of a first composition comprising a polymeric binder having a high internal molecular cohesion and which wets said particles, units and aggregates when contacted therewith, and the lower layer consisting of a second composition compatible both with said first composition and with that of said primer layer. Hard and light reflecting particles, units and aggregates are embedded at various levels throughout the thickness of said primer layer to provide improved anti-skid properties and nighttime visibility to said material when secured on a roadway pavement.

These and other features and advantages of the new material will be made apparent from a consideration of the following detailed description of several nonlimiting embodiments of the invention, reference being made to the accompanying drawings.

THE SEVERAL VIEWS OF THE DRAWINGS

FIG. 1 is an enlarged fragmentary vertical sectional view of a first example of the material of the invention;

FIG. 2 is a greatly enlarged view of one aggregate included in the material of FIG. 1;

FIG. 3 is a view similar to that of FIG. 1 and illustrates a modified example of the material;

FIG. 4 diagrammatically illustrates a procedure for forming an improved material which includes particles for imparting anti-skid properties at various levels in the upper layer thereof;

FIGS. 5 and 6 diagrammatically illustrate another procedure for forming the material and respectively for imparting the desired anti-skid property to the freshly formed upper layer;

FIGS. 8A to 8D diagrammatically illustrate the principal steps and means for forming the material by making use of a further procedure, the material produced thereby being shown in FIG. 9, in fragmentary vertical longitudinal sectional view; and FIGS. 10 and 11 diagrammatically illustrate still further means and procedures for producing the improved material.

DETAILED DESCRIPTION OF THE PREFERRED EMBODIMENTS

Referring first to FIGS. 1 and 2, there is shown a first example of the new improved material, as applied on a roadway pavement 10 and, more particularly, upon a doctored primer layer 12, preliminarily and freshly formed, according to the art, on the said pavement 10 and consisting of an impervious generally bitumen based composition.

The material comprises a lower layer 14 adapted to be adhesively and firmly bound to said primer layer, as shown, and acting as a support and intermediate binder means for an upper principal layer 18. The lower layer 14 is of a composition compatible with that of the primer layer 12 for ensuring a firm and permanent bond throughout the interface 16, and compatible with that of the upper layer 18. One example of such composition will be given below. Suitable compositions might however be found or devised by those skilled in the art, upon taking into consideration the compositions of the adjacent layers.

The said lower layer 14 is flexible or pliable to enable the entire compound material to be coiled up onto bobbins, for storage, transportation and manipulation. The said layer 14 might also advantageously be used after for imparting a most desirable resistance to tension and to elongation to the entire compound material and, therefore the said layer 14 can be fiber-reinforced and also, if desired, can comprise a reinforcing fabric or canvass impregnated with said composition, to provide the desired compatibility at the interfaces with the upper component and with the primer layer.

In view of the fact that the upper and principal layer 18 comprises, according to a preferred embodiment of the invention, an essentially transparent composition (as discussed below), the said lower layer composition comprises further, if combined with an upper layer as above, suitably colored fillers, such as whiteners, and opacifiers, to impart the required white (or other) color to the traffic regulating sign, such as a traffic lane dividing line, for example.

While the lower layer 14 can be made as thin as possible, within the limits necessary for providing the required bond, consistency and, if desired, resistance and inextensibility, the upper layer, which forms the portion of the material designed to be progressively worn by the traffic while providing, until nearly completely worn-off, the most desirable resistance to wear as well as the most desirable anti-skid properties, anti-skid property and nighttime visibility should be rather thick. The said upper layer preferably but not necessarily comprises a transparent composition including one or more polymeric binders possessing a high internal molecular cohesion, preferably provided by the presence of an oxygen atom, such as of carbonyl, adjacent to a hydrogen atom which exerts an attraction on the electrons of the outer ring of the oxygen (thus providing a hydrogen bond). Examples of polymeric binders possessing such high internal molecular cohesion are the polyamide resins, the polyurethane resins and the polyterephthalate resins.

In a freshly manufactured and still unworn tape material according the invention, a multiplicity of unitary and/or aggregate elements of size generally less than 1 millimeter are embedded in the upper layer 18, with some of the elements being completely embedded therein, so that the layer 18 must necessarily have a thickness greater than the size of some of said elements. At least some of the elements comprise a particle of a hard substance, having a hardness of at least 6 on the Mohs' hardness Scale. Such elements, where partially emeging above the upper exposed surface of said upper layer 18, provide a surface roughness which imparts to the sign the desired anti-skid property, as each emerging particle forms a hard and sharp point P.

The number of said elements in a given volume of layer 18 is determined, by easy experimentation, so as to provide a population of emerging portions such that not more than 20 percent of the surface area is covered thereby, the density of such population being a function of the nature of such elements (their hardness and sharpness, that is their ability to provide a more or less firm grip on the vehicles' tires) and of the character and the average traffic on the roadway to be marked.

FIGS. 1 and 2 illustrate an advantageous embodiment of such elements, capable of providing the combination of good anti-skid properties and a desirable nighttime visibility. Each of such elements, generally indicated at 20, comprises a crystalline particle 22 of a hard substance, such as corundum, silicon carbide, or some other substance, coated by and bound, by means of a resinous layer 24, to a monolayer (or a multiple layer) of tiny glass beads 26, the intermediate binder layer 24 being of the nature of the composition with which the upper layer 18 is formed, but including light-reflecting or light-diffusing fillers, such as tiny aluminum flakes, titanium dioxide and so on.

In the material in service, an upwardly emerging element 20 appears essentially as shown in FIG. 2 (note the metric scale for preferred dimensions). The beads which originally coat the emerging point P have been promptly torn-off by the traffic, or by a preliminary treatment such as brushing so as to provide an efficient marker as soon as the material has been applied on a roadway pavement, and the said point P provides for the anti-skid property, while the ring of beads 26, which partially emerges about said point, provides for retro-collimation of the light emitted by the vehicle headlamps, that is provides for nighttime visibility.

In the preferred embodiment of the invention, wherein the said upper layer 18 consists of a transparent or nearly transparent composition, some of the beads 26 which are still completely embedded in said layer, can also be impinged by said light thus contributing to improved nighttime visibility. In such embodiment the said beads 26 are formed of a glass or other transparent material the refractive index of which is greater than and markedly different from that of said transparent composition.

It has been unexpectedly found that the emerging points P provide an efficient defensive action for the beads against the traffic wear, and that beads very near the tips of the emerging crystals remain in place even if nearly completely exposed above the surface of the material.

As shown in FIG. 1, elements 20 are variously positioned at different levels throughout the thickness of the layer 18. It is evident that, notwithstanding the resistance to wear possessed by the binder composition of high internal molecular cohesion, such layer will progressively become thinner and thinner under the traffic wear. The consequent loss of emerging elements is however compensated for by the emergence of other elements, located at lower levels. The improved material, therefore, has been proved as capable of maintaining its anti-skid properties and nighttime visibility, until its upper layer 18 has been reduced, by wear, to a thickness nearly equal to two-thirds, and even down to half, of the greatest dimension of the originally embedded elements 20.

A proper population of emerging elements such as indicated at 20 in FIGS. 1 and 2, and which elements preferably have a greatest dimension averaging from 300 to 400 microns, imparts a coarseness or macro-roughness to the surface exposed to traffic. A micro-roughness can be provided by forming the gripping points P with the emerging portions of tiny hard crystals 28, such as shown in FIG. 3. In said latter embodiment, the nighttime visibility can be provided by mixing the composition with said tiny crystals and with conventional retro-collimating glass spheres, such as indicated at 30, and/or with aggregates such as indicated at 20 and described above.

A material having its desired anti-skid property imparted by said "surface micro-roughness" has certain advantages in comparison with a material of the former type, shown in FIGS. 1 and 2. While said former type has an overall greater efficiency, the latter type might be more economical and can comprise particles of substances which are not very hard. For example, quartz crystals of average size from 30 to 40 microns can be used in an amount of 10 to 30 percent by weight of that of the composition of layer 18, the greater density of the population of the emerging tips being compensated for by the proportionately smaller areas of the individual emerging tips. The greater population, density on the other hand, provides an improved resistance to wear.

Further, in an improved material of the above character the anti-skid property can be said to be the "primary requirement" (a skiddy area on a surface subject to traffic cannot be tolerated) while the nighttime visibility can be said to be a very desirable but not truly essential requirement. Now, a material such as shown in FIG. 3 might have all of its retro-collimating elements 30 lost by wear and still provide a firm grip, until the thickness of its upper layer 18 is reduced to less than the average size of the tiny crystalline particles. Such modified embodiment of the invention can therefore be useful for the marking of secondary country roads and the like to ensure a very long life-time at least as far as the anti-skid property is concerned.

Depending upon the particular service requirements, several crystalline substances having a hardness of at least 6 on the Mohs' Hardness Scale can be used. For example, these range from orthoclase (hardness: 6) to quartz (hardness: 7), to aluminum silicofluoride (hardness: 8), to aluminum sesquioxide (hardness: 9) and up to silicon carbide (carborundum, hardness: 9.5).

The composition of said principal layer 18 may comprise the following components according to the following non-limiting example.

EXAMPLE 1

| components | parts by weight |
| --- | --- |
| Polyurethane resin (such as "Desmadur N", by Farbenfabriken Bayer) | 120 |
| Hardener therefor (such as "DESMOPHEN 651", same) | 100 |
| Solvent for the Hardener, such as methylethylketone | 66 |
| Catalyst, such as diazo 2-2-2 dicyclo-octane | 1 |
| | Parts 287 | to the above, there is added from 20 to 100 parts by weight of unitary or composite anti-skid and light reflective elements to provide the servicing layer.

Several procedures can be made use of for providing the layer 18 on a suitable support layer 14. For example:

As shown in FIG. 4 a first thin layer 18', of thickness not greater than the average size of the particles to be embedded, is formed for example by spreading and doctoring a partially polymerized composition on said layer 14. A proper first quantity of particles 28' is dropped on and, if necessary, pressed into said first layer 18'. After nearly complete polymerization, promoted for example by infrared heating up to 100°C, a second layer 18" which, of itself, is also thin, is similarly formed and provided with a second quantity of particles 28". A third layer 18''' and a third quantity of particles 28''' can be similarly provided, and so on, until the desired thickness of the complete layer 18 is attained, with the particles embedded at various levels and some of said particles emerging to provide the gripping points P.

FIGS. 5 and 6 illustrate that the layer 18 can be formed by extruding a composition, which has been preliminarily mixed with the proper quantity of hard particles 28 and reflective elements 30, through a conventional flat extruder 32. The thus extruded layer 18, as it issues from the extruder, contains fully embedded particles and, therefore, immediately cannot provide an efficient anti-skid action, that is when sill in the condition as shown in FIG. 5. Such efficiency can be provided, for example, by causing one ore more gaseous jets, issuing from one or more nozzles 34, to impinge on the surface of the still partially polymerized composition, to thereby uncover the particles 28 and 30 adjacent said surface (FIG. 6).

A much better nighttime visibility, as obtainable from the use of transversely positioned intensely light-reflective small strips secured above the tape material at suitably spaced intervals along the length of the same material is sometimes desired. This art has been described in my prior U.S. Pat. No. 3,587,415. FIG. 7 illustrates how an improved material as above can be provided with such upwardly projecting reflective strips, one of which is indicated at 36 and consists of a coherent agglomerate of reflectorized glass beads and spheres, preferably with a high density of reflecting elements, combined and arranged as taught in my other U.S. Pat. No. 3,746,425.

The procedure illustrated in FIGS. 8A to 8D provides an improved material, such as illustrated in FIG. 9, wherein an efficiency near that of the structure of FIG. 7 can be attained even though the upper surface of the tape material is not provided spaced with transverse protrusions. A support layer-forming extrusion 114 is caused to issue from an extruder 132. The partially polymerized extruded stock of FIG. 8A is processed under a calendering roller 50 (FIG. 8B) having spaced grooves 52 to form reliefs 54 on the upper face of the lower layer. A binder layer 56 (FIG. 8C) is applied, for example by means of a roller-type wetter 58, on each relief 54, and then a proper quantity of beads 62 is caused to drop from a supply hopper 60 (FIG. 8D) onto each relief which, therefore, will be provided with reflectorized flanks.

The upper layer 118 (FIG. 9) of a transparent composition, such as described above, is then formed upon the thus completed lower layer 114 so as to cover the reflectorized reliefs 64, which will be at least partially impinged by light passing through the transparent layer thereabove, and which will progressively emerge and be "planed off" to the extent that the upper layer wears off. The anti-skid property is provided by crystals 128 embedded in and partially emerging the said upper layer, as above above described.

The extrusion of the upper layer can be performed concurrently with the formation of the lower layer and the juxtaposition of the two layers. As shown in FIG. 10, the upper layer 218 can be extruded above a lower layer 214 as this latter layer is formed for example by calendering in a conventional apparatus 72. As shown in FIG. 11, the extruder 70 from which the upper layer 218 of FIG. 10 issues, is coupled with a second extruder 74 from which the lower layer 214 concurrently issues.

A multiplicity of compositions can be made use of for forming the lower layer provided that the above indicated requirements of compatibility and of a sure bonding are taken into account. A non-limiting composition suitable for producing said lower layer is indicated in the appended Example 2.

EXAMPLE 2

| components | parts by weight |
|---|---|
| Acrylonitrile rubber, such as "CHEMIGUM 600" (Goodyear) | 25 |
| Methacrylic polymer, such as "VEDRIL" (Montecatini) | 15 |
| Styrene rubber or butadiene-styrene rubber with high styrene content, such as "EUROPRENE K 50" (ANIC) | 10 |
| Epoxy resin, such as "EPON 828" (Shell) | 5 |
| Fine mesh cristobalite ($SiO_2$) | 20 |
| Particulate quartz (0.3 mm. size) | 5 |
| Titanium dioxide | 15 |
| Extra-fine or colloidal silica, such as "ULTRASIL VN 3" (Degussa) | 5 |
| | Parts 100 |

I claim:

1. As an article of manufacture, a tape material for securement to primer layers provided on roadway pavements so as to form traffic-regulating indicia on the latter, comprising a first layer which contains a polymeric binder having high molecular cohesion, said first layer having one surface adapted to face towards a roadway pavement and another surface adapted to be exposed to traffic; a plurality of hard particles having a minimum hardness of about 6 on the Mohs' Hardness Scale distributed among various levels of said first layer intermediate said surfaces thereof, at least some of said hard particles being provided with a sharp tip; and a second layer adapted to be secured to a primer layer on the roadway pavement bonded to said one surface of said first layer, said second layer being compatible with said first layer so that said first and second layers are firmly bonded to one another, and said second layer also being compatible with the primer layer so as to permit a firm bond to be obtained between said second and primer layers when said tape material is placed on the primer layer, said tape material being effective for imparting good anti-skid properties to a traffic-regulating indicium formed therewith due to the presence of said tips of said hard particles which provide gripping areas when exposed, and said tape material further being effective for maintaining good anti-skid properties during wear of the traffic-regulating indicium due to the distribution of said hard particles among various levels of said first layer which enables fresh hard particles to become exposed as the hard particles next to the latter are removed by wear.

2. An article as defined in claim 1, wherein light-reflecting elements are arranged about at least a portion of at least one of said hard particles.

3. An article as defined in claim 1, wherein said tape material is flexible.

4. An article as defined in claim 1, wherein said other surface of said first layer is approximately planar.

5. An article as defined in claim 1, wherein said second layer is fiber-reinforced.

6. An article as defined in claim 1, wherein the thickness of said first layer is greater than approximately the largest dimension of said hard particles.

7. An article as defined in claim 1, said tape material having a predetermined thickness; and wherein the thickness of said first layer is greater than about one-half of said predetermined thickness.

8. An article as defined in claim 1, wherein the concentration of said hard particles is such that the hard particles which project from said first layer at any time encompass an area which is equal to at most about 20 percent of the surface area of said first layer.

9. An article as defined in claim 1, wherein the average size of said hard particles is between about 30 and 40 microns.

10. An article as defined in claim 1, wherein the average size of said hard particles is between about 300 and 400 microns.

11. An article as defined in claim 1, wherein said polymeric binder comprises a substance having oxygen atoms arranged adjacent hydrogen atoms with the latter exerting an attraction on the electrons of the outer rings of said oxygen atoms to provide said high molecular cohesion.

12. An article as defined in claim 11, wherein said polymeric binder comprises a carbonyl.

13. An article as defined in claim 2, wherein a binding agent is arranged intermediate said elements and said one hard particle for securing said elements about the latter.

14. An article as defined in claim 13, wherein a light-reflecting filler is provided in said binding agent.

15. An article as defined in claim 14, wherein said filler comprises at least one member of the group consisting of aluminum flakes and titanium dioxide.

* * * * *